(12) United States Patent
Janssen

(10) Patent No.: US 6,683,658 B2
(45) Date of Patent: Jan. 27, 2004

(54) SCANNER PHASE CONTROL FOR A SCROLLING COLOR PROJECTOR

(75) Inventor: Peter J. M. Janssen, Scarborough, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 436 days.

(21) Appl. No.: 09/833,859

(22) Filed: Apr. 12, 2001

(65) Prior Publication Data

US 2002/0149749 A1 Oct. 17, 2002

(51) Int. Cl.[7] ................................................. H04N 9/31
(52) U.S. Cl. ........................ 348/760; 348/766; 348/761; 348/551
(58) Field of Search ................................ 348/744, 750, 348/756, 757, 759, 760, 761, 766, 778, 779, 780, 781, 786, 790, 791, 792, 196, 202, 551; 353/30, 31, 33, 34, 29, 37, 28, 48, 49, 50, 81, 82, 84; 359/443, 448, 449; 358/505, 511, 515, 408; 349/517, 57; H04N 9/31

(56) References Cited

U.S. PATENT DOCUMENTS

| | | | | |
|---|---|---|---|---|
| 5,239,322 A | * | 8/1993 | Takanashi et al. | ............ 353/31 |
| 5,416,514 A | * | 5/1995 | Janssen et al. | ............ 348/761 |
| 5,548,347 A | * | 8/1996 | Melnik et al. | ............ 348/761 |
| 5,863,125 A | * | 1/1999 | Doany | ........................ 353/84 |

* cited by examiner

Primary Examiner—Sherrie Hsia

(57) ABSTRACT

A scanner phase control for a scrolling color projector utilizes the back-EMF value of a motor which rotates a prism of the scanner to set a reference point for the prism. A reference phase signal is provided which corresponds to timing information of the scan of a stripe of light provided by the prism. The phase of the motor is altered in response to the reference phase signal such that the back-EMF zero crossings of the motor coincide with the beginning of a scan as identified by the reference phase signal.

20 Claims, 1 Drawing Sheet

SCANNER PHASE CONTROL FOR A SCROLLING COLOR PROJECTOR

FIELD OF THE INVENTION

The present invention relates to a scrolling color projector, and more specifically to the phase control for a colored light scanner of a scrolling color projector.

BACKGROUND OF THE INVENTION

A scrolling color projector produces full color images from a single light modulator by illuminating a liquid crystal panel with multiple stripes of colored light (red, green, blue) that continuously scroll, from top to bottom, over the liquid crystal panel. In order to scroll the multiple stripes of colored light over the liquid crystal panel, the strolling color projector includes a scanner for each color of light to be scrolled over the liquid crystal panel. Each scanner includes a prism connected to the shaft of a motor. The motor controls rotation of the prism. Also attached to the motor is a precision optical encoder which provides information regarding the position of the motor shaft, and correspondingly the rotation of the prism and the scan of each stripe of colored light on the panel.

The precision optical encoder provides information for control of the motor and correspondingly for control of the prism. The phase and rotation of the prism are important because each stripe of colored light must be projected and scrolled on the liquid crystal panel at specific times in relation to video information that is provided to the liquid crystal panel. That is, the red, green and blue stripes of light must be present on a line of the panel concurrent with the presentation of the corresponding video information for that particular line. The optical encoder serves to synchronize the phase of rotation of the prism (the scan of the color stripes) with the presentation of the video information. As a result, each stripe of light, as it is being scrolled down the liquid crystal panel, appears on a particular display line coincident with the corresponding video information for that color of light.

A drawback to the prior art device is that the precision optical encoder is very costly. Typically the optical encoder costs more than the entire scanner, i.e., more than the cost of the prism and the motor together. It would therefore be beneficial to provide synchronization of scan of each color of light over the liquid crystal panel with the video information without the use of an external precision optical encoder.

OBJECTS AND SUMMARY OF THE INVENTION

It is an object of the present invention to provide a method and apparatus which provides phase control for a colored light scanner of a scrolling color projector which does not use an optical encoder.

It is a further object of the present invention to provide a method and apparatus which provides phase control for a colored light scanner of a scrolling color projector which is less expensive than prior art phase controls for colored light scanners.

It is yet another object of the present invention to provide a method and apparatus which provides phase control for a colored light scanner of a scrolling color projector and which utilizes the back EMF of a motor coupled to a prism of the scanner to synchronize the phase of the colored light scanner with the presentation of video information on the panel.

It is still a further object of the present invention to overcome inherent disadvantages of known phase control systems for a colored light scanner for scrolling color projectors.

In accordance with one form of the present invention, a scanner phase control for a scrolling color projector includes a light source for generating an input light, a color splitter operatively coupled to the light source for at least one of transmitting and reflecting the input light emitted from the light source to extract at least a first color light, and a first color scanner operatively coupled to the color splitter. The first color scanner including a motor and a prism and receiving as an input the first color light. The motor rotating the prism to scan the first color light. The scrolling color projector also includes a reference phase generator for generating a reference phase signal indicative of timing information for scanning the first color light including when a scan of the first color light should begin, a motor back-EMF sensor coupled to the motor and generating a motor back-EMF signal indicative of the back-EMF of the motor wherein the prism is coupled to the motor such that a motor back-EMF signal zero crossing is indicative of a beginning of a scan for the first color light. The scrolling color projector further includes a phase detector coupled to the reference phase generator and the motor back-EMF sensor. The phase detector receiving the reference phase signal and the motor back-EMF signal and generating a signal such that the motor back-EMF signal zero crossing is coincident with the beginning of a scan of the first color light as indicated by the reference phase signal.

In accordance with another form of the present invention, a scanner phase control for scrolling a color projector includes a light source for generating an input light, a color splitter operatively coupled to the light source for at least one of transmitting and reflecting the input light emitted from said light source to extract first, second and third color lights, and a first color scanner operatively coupled to the color splitter and including a motor and a prism. The first color light scanner receiving as an input the first color of the input light and providing a first color light output signal. The motor rotating the prism to scan the first color light output signal. The scanner phase control also includes a second color scanner operatively coupled to the color splitter and including a motor and a prism. The second color scanner receiving as an input the second color light of the input light and providing a second color light output signal. The motor of the second color scanner rotating the prism of the second color scanner to scan the second color light output signal. The scanner phase control also includes a third color scanner operatively coupled to the color splitter and including a motor and a prism. The third color scanner receiving as an input the third color light of the input light and providing a third color light output signal. The motor of the third color scanner rotating the prism of the third color scanner to scan the third color light output signal. The scanner phase control further includes a color recombiner for receiving as an input the first, second and third scanner output signals and providing a recombined light signal, a polarizing beam splitter for at least one of transmitting and reflecting the recombined light signal according to a polarization component thereof, and a phase detector operatively coupled to each of the motors. The phase detector receiving as a first input a signal indicative of the phase of rotation of each of the motors of the first, second and third color scanners, and as a second input a reference phase signal indicative of timing information for scanning each of the first, second and third color lights. The phase detector generating a signal such that each of the motors of the first, second and third color scanners is rotated in accordance with the reference phase signal.

In accordance with another form of the present invention, a scanner phase control coordinates a phase of scanning of a stripe of light provided by a prism of a color light scanner, with a video signal provided to a display. The prism being coupled to a motor such that the start of a scan coincides with a motor back-EMF value of zero. The scanner phase control including a phase detector operatively coupled to the motor. The phase detector receiving as a first input a signal indicative of the back-EMF zero-crossings of the motor. The phase detector also receiving as a second input a reference phase signal indicative of timing information for scanning the stripes of light, wherein when the reference phase signal indicates the beginning of a scan of the stripe of light, the phase of the motor is altered such that the value of the motor back-EMF is zero.

Another form of the present invention is directed to providing method of providing scanner phase control for a scrolling color projector. The scanner phase control coordinates a phase of scanning of a stripe of light provided by a prism of a scanner with a video signal. The prism being coupled to the motor such that the start of a scan of a stripe of light provided by the prism coincides with a motor back-EMF value of zero. The method including the steps of monitoring the motor back-EMF value, providing a reference phase signal corresponding to timing information for the scan of the stripes of light, determining a beginning of a scan from the reference phase signal, and altering the phase of the motor such that the motor back-EMF zero value coincides with a beginning of a scan as identified by the reference phase signal.

A preferred form of the scanner phase control for a scrolling color projector and method of providing scanner phase control as well other embodiments, objects, features and advantages of the present invention will become apparent from the following detailed description of illustrative embodiments, which is to be read in connection with the accompanying drawings.

DETAILED DESCRIPTION OF THE PREFERRED EMBODIMENTS

Figure 1:
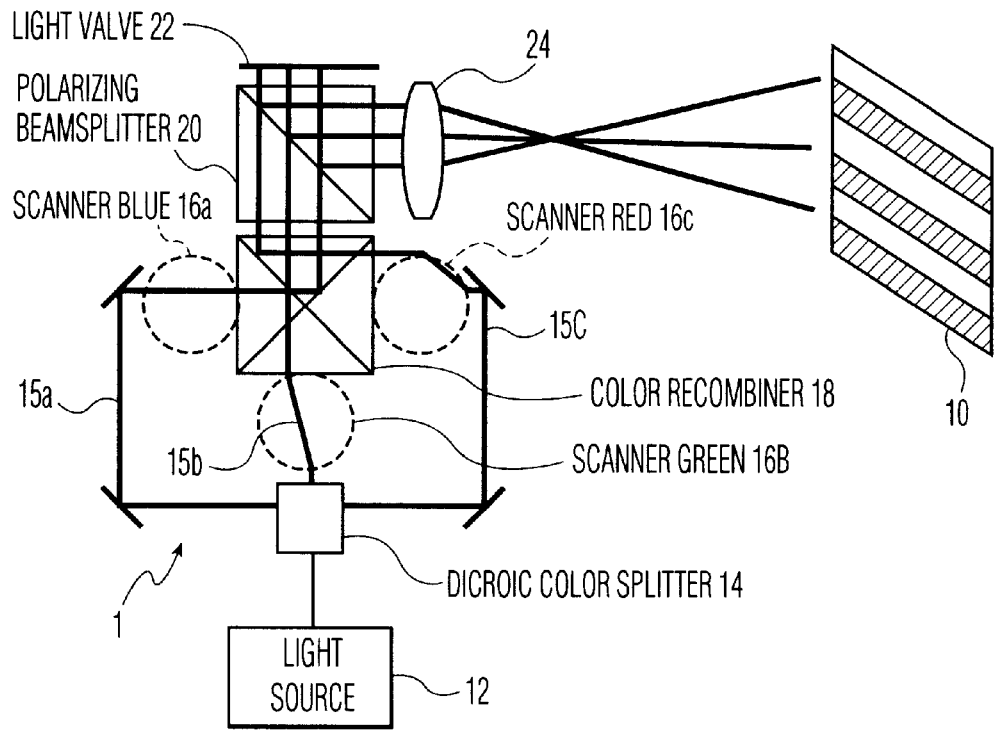
FIG. 1 is a functional block diagram of a scrolling color projector.

Referring now to FIG. 1 of the drawings, a scrolling color projector 1 for displaying an image on a screen 10 is shown. The general concepts regarding a scrolling color projector are discussed in U.S. Pat. No. 5,532,763 to Janssen et al, the entire disclosure of which is incorporated herein by reference. The scrolling color projector includes a light source 12 for generating an input light and a color splitter 14, operatively coupled to the light source, for transmitting and/or reflecting the input light emitted by the light source. The color splitter preferably extracts first, second and third light colors which are traditionally used to generate an image. The three colors correspond to blue, green and red light components which, when combined, form the input light generated by the light source.

The color splitter 14 provides blue, green and red colored light components along separate paths 15a, 15b, 15c. The blue, green and red color light components are provided to respective scanners 16a, 16b, 16c. As known in the art, the scanners include a prism coupled to the shaft of a motor (see FIG. 2). The motor rotates the prism which generates respective stripes of colored light which are provided to a light valve on which an image is to be generated.

The blue, green and red color light components (stripes of colored light) are provided from each respective scanner 16a, 16b, 16c to a color recombiner 18 which recombines the colored light components. The recombined color light components are provided to a polarizing beam splitter 20 which transmits and/or reflects the recombined color light components provided by the color recombiner according to a polarization component of the beam splitter as known in the art. The polarized recombined color light components are then provided to a light valve (liquid crystal panel) 22, as known in the art. The light valve also receives a video signal which is scanned over the light valve and which identifies the portions of the image which are to include each component of light. The light valve also receives a timing signal which provides timing information for presentation of the video signal by the light valve. The light valve modulates each line of the panel in accordance with the video signal and the scan of the polarized recombined color light components. The light valve then provides the result of the video signal and color light components to a projection lens 24 which magnifies the output of the light valve for presentation to the screen 10 for display.

As known in the art, the projection of the blue, green and red stripes of light on the light valve must be synchronized with a video signal which is also provided to the light valve. The presentation of the stripes of colored light is synchronized with the video signal by the timing signal which is not only provided to the light valve, but also to each of the scanners. However, a reference point of the scanner (prism) must be determined to identify the beginning of a light scan on the screen so that when the timing signal indicates that a scan for one color of light should begin, the corresponding prism is oriented at the reference point. As a result, the blue, green and red colored stripes of light can be properly presented on the screen during scanning (scrolling) such that the stripes are concurrently presented on a line of the panel with the corresponding video signal for that respective color of light. In the prior art, this was accomplished by the high precision optical encoder.

Figure 2:
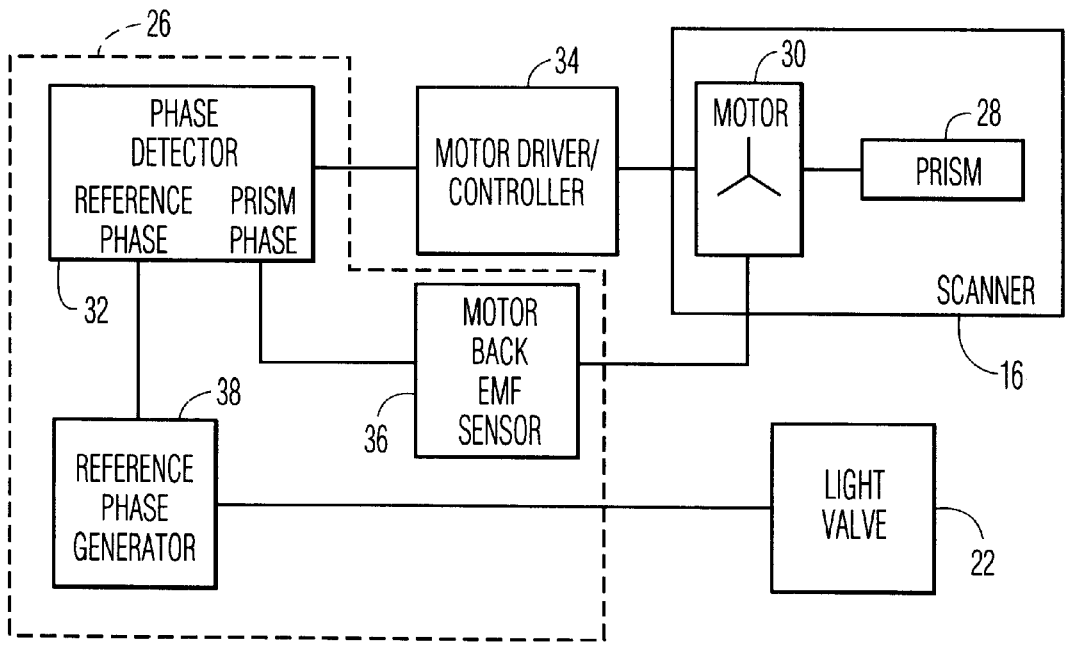
FIG. 2 is a functional block diagram of the scanner and scanner phase control for a scrolling color projector according to the present invention.

Referring now to FIG. 2, the scanner phase control of the present invention includes a scanner phase control circuit 26 operatively coupled to each scanner 16 of the scrolling color projector 1. Each scanner includes a prism 28 operatively coupled to the shaft of a motor 30. In connection with the present invention, the prism is not arbitrarily coupled to the motor shaft but is coupled such that the beginning of a scan of a corresponding stripe of light on the light valve corresponds to the motor having a back-EMF value of zero (i.e., a motor back-EMF zero crossing). The scanner phase control circuit 26 includes a phase detector 32 coupled via a motor driver 34 to a respective motor 30 of the scanner 16, a motor back-EMF sensor 36 coupled to the motor and the phase detector, and a reference phase generator 38.

The reference phase generator 38 is coupled to the light valve 22 and generates a reference phase signal (sync signal or timing signal) indicative of timing information for the scanner and light valve such that the scan of the corresponding stripe of light from the scanner is in-phase with the video signal that is also provided to the light valve.

As mentioned above, operatively coupled to the phase detector 32 is the motor back-EMF sensor 36 which monitors the back-EMF of the motor 30. As mentioned previously, due to the specific orientation of the prism 28 on the motor shaft, a zero motor back-EMF value is indicative of a known reference position of the rotation of the motor and the prism (i.e., the beginning of a scan). The motor back-EMF sensor provides a signal to the phase detector 32 corresponding to the motor back-EMF which is indicative of the phase of the prism.

As mentioned previously, the reference phase generator 38 is operatively coupled to the light valve 22. When the reference phase signal indicates that the beginning of a scan of a stripe of colored light from the scanner 16 is to begin, the motor driver 34 alters the phase of the motor 30 in response to a signal provided by the phase detector 32 such that a back-EMF value of zero for the corresponding motor will occur each time a scan is to begin (i.e., each time the stripe of light starts at the top of the light valve during the scrolling process). The prism is always kept in phase with the reference phase signal by the feedback provided by the motor back-EMF sensor.

The present invention is advantageous because an expensive optical encoder need not be attached to the scanner to monitor the phase of the stripes of colored light. Instead, the prism is precisely attached to the motor shaft such that a motor back-EMF value of zero corresponds to the beginning of a scan so that the presentation of the stripes of colored light can be easily kept in phase with the video signal utilizing information which is easily accessible from the motor with low cost components.

The phase controller 26 shown in FIG. 2 is preferably repeated for each scanner 16 of the scrolling color projector. It is also foreseen that a single phase detector 32, reference phase generator 38 and motor back-EMF sensor 36 could be used if each has appropriate inputs and outputs to allow for the simultaneous monitoring of the blue, green and red scanners.

In the preferred embodiment the motor and prism are chosen such that the motor has a magnetic symmetry that is similar to a geometrical symmetry of the corresponding prism which is coupled thereto. That is, the motor has a number of pairs of magnetic poles that is equal to the number of facets of the prism. For example, in the case where the prism has a square cross-section, this means that the prism has a four-fold symmetry and the motor then must also have a four-fold symmetry (four pole-pairs) such that a one-quarter revolution of the motor gives exactly the same condition as the starting position (i.e., every one-quarter revolution gives a repeat). It is also foreseen that other symmetries such as six, eight and ten fold symmetry can be employed.

Having described specific embodiments of the invention with reference to the accompanying drawings, it will be appreciated that the present invention is not limited to those precise embodiments and that various changes and modifications can be effected therein by one of ordinary skill in the art without departing from the scope or spirit of the invention defined by the amended claims. For example, it is foreseen that if the prism is not oriented on the motor shaft such that a motor back-EMF zero value does coincide with a beginning of a scan of the associated light, then an offset signal (delay) can be calculated and combined with the reference phase signal to account for the inaccuracy in placement of the prism. In addition, optical errors in optical alignment, which cause a shift of the illumination on the light valve, can be corrected in the same way.

What is claimed:

1. A scrolling color projector for displaying an image on a screen, comprising:
    a light source for generating an input light;
    a color splitter operatively coupled to the light source for at least one of transmitting and reflecting the input light emitted from said light source to extract at least a first color light;
    a first color scanner operatively coupled to the color splitter and including a motor and a prism, the first color scanner receiving as an input the first color light, the motor rotating the prism to scan the first color light;
    a reference phase generator for generating a reference phase signal indicative of timing information for scanning the first color light including when a scan of the first color light should begin;
    a motor back-EMF sensor coupled to the motor, the motor back-EMF sensor generating a motor back-EMF signal indicative of the back-EMF of the motor wherein the prism is coupled to the motor such that a motor back-EMF signal zero crossing is indicative of a beginning of a scan for the first color light;
    a phase detector coupled to the reference phase generator and the motor back-EMF sensor, the phase detector receiving the reference phase signal and the motor back-EMF signal and generating a signal such that the motor back-EMF signal zero crossing is coincident with the beginning of a scan of the first color light as indicated by the reference phase signal.

2. The scrolling color projector for displaying an image on a screen according to claim 1 further comprising:
    a motor driver operatively coupled to the phase detector and the motor, the motor driver being responsive to the phase detector to alter the phase of the motor such that the motor back-EMF signal zero crossing is coincident with the beginning of a scan of the first color light as indicated by the reference phase signal.

3. The scrolling color projector for displaying an image on a screen according to claim 1 further comprising:
    a second color scanner operatively coupled to the color splitter and including a motor and a prism, the second color scanner receiving as an input a second color light, the motor of the second color scanner rotating the prism of the second color scanner to scan the second color light;
    a second reference phase generator for generating a second reference phase signal indicative of timing information for scanning the second color light including when a scan of the second color light should begin;
    a second motor back-EMF sensor coupled to the motor of the second color scanner, the second motor back-EMF sensor generating a second motor back-EMF signal indicative of the back-EMF of the second color scanner motor wherein the prism is coupled to the motor such that a second motor back-EMF signal zero crossing is indicative of a beginning of a scan for the second color light;
    a second phase detector coupled to the second reference phase generator and the motor back-EMF sensor, the second phase detector receiving the second reference phase signal and the second motor back-EMF signal and generating a signal such that the second motor back-EMF signal zero crossing is coincident with the beginning of a scan of the second color light as indicted by the reference phase signal.

4. The scrolling color projector for displaying an image on a screen according to claim 3 further comprising:

a color recombiner, the color recombiner receiving as an input at least the first and second color lights output by the first and second color scanners and providing a recombined light signal.

5. The scrolling color projector for displaying an image on a screen according to claim 3 further comprising:

a third color scanner operatively coupled to the color splitter and including a motor and a prism, the third color scanner receiving as an input a third color of the input light, the motor of the third color scanner rotating the prism of the third color scanner to scan the third color light on the screen;

a third reference phase generator for generating a third reference phase signal indicative of timing information for scanning the third color light including when a scan of the third color light should begin;

a third motor back-EMF sensor coupled to the motor of the third color scanner, the second motor back-EMF sensor generating a third motor back-EMF signal indicative of the back-EMF of the third color scanner motor wherein a third motor back-EMF signal zero crossing is indicative of a beginning of a scan for the third color light;

a third phase detector coupled to the third reference phase generator and the motor back-EMF sensor, the third phase detector receiving the third reference phase signal and the third motor back-EMF signal and generating a signal such that the third motor back-EMF signal zero crossing is coincident with the beginning of a scan of the third color light as indicated by the reference phase signal.

6. The scrolling color projector for displaying an image on a screen according to claim 5 further comprising:

a color recombiner, the color recombiner receiving as an input at least two of the first, second and third color lights and providing a recombined light signal.

7. The scrolling color projector for displaying an image on a screen according to claim 6 further comprising:

a polarizing beam splitter for at least one of transmitting and reflecting the recombined light signal according to a polarization component thereof.

8. The scrolling color projector for displaying an image on a screen according to claim 7 further comprising:

a projection lens operatively coupled to the polarizing beam splitter, the projection lens magnifying and projecting the recombined light signal on the screen.

9. The scrolling color projector for displaying an image on a screen according to claim 7 further comprising:

a light valve operatively coupled to the polarizing beam splitter and the reference phase generator, the light valve receiving a video reference phase signal including timing information and scanning a video signal thereover in accordance with the video reference phase signal.

10. The scrolling color projector for displaying an image on a screen according to claim 1 wherein the motor has a magnetic symmetry which corresponds to a geometrical symmetry of the prism which is coupled thereto.

11. The scrolling color projector for displaying an image on a screen according to claim 10 wherein the prism is a four-sided prism and the motor has four magnetic pole pairs.

12. A scrolling color projector comprising:

a light source for generating an input light;

a color splitter operatively coupled to the light source for at least one of transmitting and reflecting the input light emitted from said light source to extract first, second and third color lights;

a first color scanner operatively coupled to the color splitter and including a motor and a prism, the first color light scanner receiving as an input the first color of the input light and providing a first color light output signal, the motor rotating the prism to scan the first color light output signal;

a second color scanner operatively coupled to the color splitter and including a motor and a prism, the second color scanner receiving as an input the second color light of the input light and providing a second color light output signal, the motor of the second color scanner rotating the prism of the second color scanner to scan the second color light output signal;

a third color scanner operatively coupled to the color splitter and including a motor and a prism, the third color scanner receiving as an input the third color light of the input light and providing a third color light output signal, the motor of the third color scanner rotating the prism of the third color scanner to scan the third color light output signal;

a color recombiner for receiving as an input the first, second and third scanner output signals and providing a recombined light signal;

a polarizing beam splitter for at least one of transmitting and reflecting the recombined light signal according to a polarization component thereof; and a phase detector operatively coupled to each of the motors, the phase detector receiving as a first input a signal indicative of the phase of rotation of each of the motors of the first, second and third color scanners, the phase detector receiving as a second input a reference phase signal indicative of timing information for scanning each of the first, second and third color lights, the phase detector generating a signal such that each of the motors of the first, second and third color scanners is rotated in accordance with the reference phase signal.

13. The scrolling color projector according to claim 12 further comprising:

a motor driver operatively coupled to the phase detector and each of the motors, the motor driver being responsive to the phase detector to phase align the scan of the first, second and third color lights with a video signal.

14. The scrolling color projector according to claim 12 wherein the first input signal corresponds to the back-EMF zero crossing of at least one of the motors of the first, second and third color scanners.

15. The scrolling color projector according to claim 12 wherein at least one of the motors of the first, second and third color scanners has a magnetic symmetry which corresponds to a geometrical symmetry of the corresponding prism which is coupled thereto.

16. The scrolling color projector according to claim 15 wherein the prism is a four-sided prism and the motor has four magnetic pole pairs.

17. A scanner phase control for a scrolling color projector, the scanner phase control coordinating a phase of scanning of a stripe of light provided by a prism of a color light scanner, with a video signal provided to a display, the prism being coupled to a motor such that the start of a scan coincides with a motor back-EMF value of zero comprising:

a phase detector operatively coupled to the motor, the phase detector receiving as a first input a signal indicative of the back-EMF zero-crossings of the motor, the phase detector also receiving as a second input a reference phase signal indicative of timing information for scanning the stripes of light;

wherein when the reference phase signal indicates the beginning of a scan of the stripe of light, the phase of the motor is altered such that the value of the motor back-EMF is zero.

18. The scanner phase control according to claim 17 wherein the motor has a magnetic symmetry which corresponds to a geometrical symmetry of the corresponding prism which is coupled thereto.

19. The scanner phase control according to claim 17 wherein the prism is a four-sided prism and the motor has four magnetic pole pairs.

20. A method of providing scanner phase control for a scrolling color projector, the scanner phase control coordinating a phase of scanning of a stripe of light provided by a prism of a scanner with a video signal, the prism being coupled to a motor such that the start of a scan of a stripe of light provided by the prism coincides with a motor back-EMF value of zero; comprising:

monitoring the motor back-EMF value;

providing a reference phase signal corresponding to timing information for the scan of the stripes of light;

determining a beginning of a scan from the reference phase signal; and altering the phase of the motor such that the motor back-EMF zero value coincides with a beginning of a scan as identified by the reference phase signal.

* * * * *